3,061,883
POLYMERS OF CARBOXYLIC MODIFIED CO-POLYMERS OF BUTADIENE-1,3 HYDROCARBONS AND ACRYLIC NITRILES
Erich K. Frank, Westport, Conn., assignor to E. I. du Pont de Nemours and Company, Wilmington, Del., a corporation of Delaware
No Drawing. Filed Dec. 7, 1959, Ser. No. 857,506
2 Claims. (Cl. 18—47.5)

This invention relates to a process and, more particularly, to an improved process for making molded articles of carboxylic-modified copolymers of butadiene-1,3 hydrocarbons and acrylic nitriles.

Carboxylic-modified copolymers of butadiene-1,3 hydrocarbons and acrylic nitriles and, particularly, those compounded with polyvalent metallic oxides have found wide use in recent years because, for example, they have excellent abrasion and oil resistance and high tensile strength and flexibility. Molded articles of carboxylic-modified copolymers of butadiene-1,3 hydrocarbons and acrylic nitriles are conventionally prepared by compounding the copolymers with polyvalent metallic oxide curing agents and conventional additives such as pigments and fillers, plasticizers, accelerators and the like, then molding and curing the resulting compounded stock at elevated temperatures. If the molded articles are to be formed from fabrics and other substrates coated with the carboxylic-modified copolymers, the substrates are coated with the copolymers prior to molding and curing.

In the preparation of molded articles of such carboxylic-modified copolymers as just described, several problems have been encounted. First, the carboxylic-modified copolymers are somewhat sticky, particularly at high temperatures. Consequently, when they are molded, they stick to molds. Also, such copolymers must be retained in molds for relatively long periods, for example, on the order of ten minutes, in order that the resulting articles retain their molded shape. Additional problems have been encountered when fabrics and other substrates coated with such copolymers are molded, for example, into gaskets, diaphragms and the like. For example, when fabrics coated on one or both sides with compositions containing the aforementioned carboxylic-modified copolymers are molded, the fabrics tend to move through the coating, that is, migrate.

I have found an improvement in the aforementioned method of making molded articles of carboxylic-modified copolymers of butadiene-1,3 hydrocarbons and acrylic nitriles which prevents sticking in molds, reduces dwell times in molds and, with coated fabrics and other coated substrates, prevents migration. This improvement comprises, prior to molding and curing, heating the carboxylic-modified copolymers of butadiene-1,3 hydrocarbons and acrylic nitriles compounded with polyvalent metallic oxides in the presence of water at a temperature of at least about 125° F. but below the temperature at which the copolymers begin to cure until the Mooney viscosity of the compounded copolymers increases at least about 100%.

The change in the Mooney viscosity of the compounded copolymers during the water-treatment step of this invention is a measure of the preset imparted to the compounded copolymers by this step. Mooney viscosity can be measured with the viscometer and by the procedure described in ASTM D 927–55T. A test temperature of 212° F. and the large viscometer rotor described in ASTM D 927–55T are used. The sample under test is held in the heated viscometer for 1 minute before the viscometer rotor is started and the reading is taken 4 minutes after the rotor is started. Of course, if a fabric coated with the compounded carboxylic-modified copolymer is to be treated with water, then molded and cured as described herein, the Mooney viscosity must be measured on a sample of the compounded copolymer without fabric. Also, the sample on which the viscosity is measured should be substantially dry; otherwise, a true measure of the preset imparted by the water treatment may not be obtained because additional preset may occur in the viscometer.

The carboxylic-modified copolymers of butadiene-1,3 hydrocarbons and acrylic nitriles used in the improved molding process of this invention and the methods by which they can be prepared are described, for example, in U.S. Patent Nos. 2,724,707 and 2,395,017. A preferred process for preparing the carboxylic-modified copolymers is described by H. P. Brown and C. J. Gibbs in "Carboxylic Elastomers," Rubber Chemistry and Technology, 28, p. 937 (1955).

Typical butadiene-1,3 hydrocarbons used in preparing such copolymers are, for example, butadiene-1,3 and the 5 to 9 carbon atom homologues thereof such as isoprene, 2,3-dimethyl butadiene-1,3, pentanediene-1,3, hexadiene-1,3 and mixtures thereof. As used herein, the terms "acrylic nitriles" refer to acrylonitrile and alpha-substituted acrylonitriles, that is, compounds having the formula:

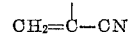

Examples of acrylic nitriles are acrylonitrile, methacrylonitrile, ethacrylonitrile, alpha-butylacrylonitrile, alpha-phenyl acrylonitrile, alpha-chloroacrylonitrile and alpha-methoxymethyl acrylonitrile and mixtures thereof.

Carboxyl groups are introduced into the copolymers by copolymerizing the aforementioned butadiene-1,3 hydrocarbons and acrylic nitriles with at least one acrylic acid. Copolymers containing about from 0.01 to 0.3, and preferably 0.05 to 0.15 carboxyl equivalent of at least one acrylic acid per 100 parts by weight of copolymer are preferred. As used herein the term "carboxyl equivalent" of an acrylic acid refers to the amount of the chemically combined acrylic acid which contains one equivalent weight, that is, 45 parts by weight of free carboxyl groups. The amount of free carboxyl groups in a given copolymer can be determined by titrating a solution of the carboxylic-modified copolymer with alcoholic potassium hydroxide to a phenolphthalein end-point. As used herein, the term "acrylic acids" refers to acrylic acid and alpha-substituted acrylic acids, that is, compounds having the structural formula:

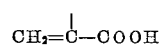

Examples of acrylic acids which are copolymerized with butadiene-1,3 hydrocarbons and acrylic nitriles thereby introducing free carboxyl groups into the copolymers are acrylic acid, methacrylic acid, ethacrylic acid, alpha-chloro acrylic acid and the like. Copolymers of about from 50 to 80% by weight of butadiene-1,3 and about from 10 to 45% by weight of acrylonitrile containing about from 0.01 to 0.3, and preferably 0.05 to 0.15 carboxyl equivalent of acrylic or methacrylic acid per 100 parts by weight of copolymer are preferred.

Polyvalent metallic oxides, either alone or in combination with other auxiliary curing agents such as sulfur, are compounded with and used to cure the carboxylic-modified copolymers. Examples of such polyvalent metallic oxides are zinc oxide, calcium oxide, magnesium oxide, dibutyl tin oxide, lead oxide, barium oxide, cobalt oxide, tin oxide, strontium oxide and mixtures thereof. Zinc oxide and mixtures thereof with sulfur are preferred. Usually about from 1 to 30 parts of polyvalent metallic oxide per 100 parts by weight of carboxylic-modified copolymer are used.

Any of the conventional procedures can be used for compounding the carboxylic-modified copolymers. Preferably, the copolymers are first premilled on a standard rubber mill, Banbury mixer or other conventional rubber milling device. Next, usually pigments and fillers, plasticizers, antioxidants and the like are milled therewith. Finally, the polyvalent metallic oxide curing agent, auxiliary curing agents and accelerators are milled with the resulting composition to yield the finished compounded stock.

Typical pigments and fillers which can be used are, for example, carbon black, calcium carbonate, clay, hydrated silica, diatomaceous earth, talc and mixtures thereof. Usually about from 25 to 100 parts by weight per 100 parts by weight of carboxylic-modified copolymer are used. Examples of plasticizers which can be used are di(2-ethyl hexyl)phthalate, di(2-ethyl hexyl) azelate, dibutyl phthalate, tributoxy ethyl phosphate, dioctyl adipate, dibutoxy ethyl sebacate, epoxidized soya-bean oil, cumarone-indene resins and mixtures thereof. Usually about from 10 to 100 parts of plasticizer per 100 parts by weight of carboxylic-modified copolymers are used. Examples of antioxidants are polymerized trimethyl dihydroquinoline, phenyl beta-naphthylamine, phenyl alpha-naphthylamine, hydroquinone monobutyl ether and paraffin hydrocarbons. Examples of conventional accelerators which can be used are N-cyclohexyl-2-benzothiazole sulfenamide, dicumyl peroxide, tetramethyl thiuram monosulfide, di-2-benzothiazyl disulfide and the like. The aforementioned antioxidants and accelerators as well as other conventional additives such as stearic acid and maleic acid can be used in conventional amounts.

Although the carboxylic-modified copolymers employed in this invention can, and usually are used as the sole polymeric material other polymeric materials in amounts up to about 50% by weight based on the total weight of polymer can be used. Such polymers which can be compounded with the carboxylic-modified copolymers described herein are, for example, copolymers of butadiene-1,3 and acrylonitrile, copolymers of butadiene-1,3 and styrene, polyisobutylene, natural rubber, polyisoprene, homopolymers and copolymers of vinyl chloride and vinylidene chloride and mixtures thereof. Copolymers of butadiene-1,3 which do not contain carboxyl modification are particularly preferred polymeric additives.

For molded objects such as bushings, the compounded rubber stock can be chopped, cut or chipped into pieces of suitable size for molding, then directly heated in the presence of water as described hereinafter. However, if the compounded stock is to be used in coating fabrics and other substrates, the fabrics are first coated, for example, by conventional calender-coating techniques, then heated in the presence of water. Typical examples of fabrics which can be coated and treated by the process of this invention include woven twills, drills and ducks; jersey, tricot and simplex knitted materials; and impregnated and unimpregnated non-woven fabrics. The choice of the particular fibers used in such fabrics is not critical provided the fibers will withstand the curing and molding temperatures used for the article. Typical fibers include those of polyamides, polyesters, polyesteramides, cotton, glass and the like.

The compounded carboxylic-modified copolymers in a form ready for molding are next heated in the presence of water until the Mooney viscosity thereof has increased at least about 100%, and preferably about from 100 to 200%. For most uses, the Mooney viscosity should not increase much above 600%; otherwise it may be difficult to mold the resulting compounded copolymers. As stated hereinbefore, the compounded carboxylic-modified copolymers are heated in the presence of water at a temperature of at least about 125° F. The upper limit of the temperature used during the water treatment varies somewhat with the particular curing agents and accelerators used to compound the carboxylic-modified copolymers. In any case, however, an upper temperature limit below that at which the composition begins to cure should be used; otherwise, the compounded carboxylic-modified copolymers are difficult to mold. Since most compounded stocks of such carboxylic-modified copolymers begin to cure at about 250 to 300° F., temperatures below about 200° F. are usually employed, particularly if relatively long heating periods are used during the water-treatment step. In general, longer heating periods are employed at lower temperatures and vice versa. The time which the copolymers are exposed to water depends to a large extent upon how the copolymers are exposed to water and the thickness of the material treated. In general, if the copolymers are exposed to liquid water at room temperature they must be exposed to water for longer periods than if they are exposed to steam or hot water. Likewise, thick sheets or pieces of such compounded copolymers must be exposed to water for longer periods than thin sheets or pieces.

The preferred procedure for treating the compounded copolymers with water is to expose them to an atmosphere having a relative humidity of about 90 to 100% and a temperature of about from 125 to 200° F., and preferably 150 to 180° F. for about from 10 to 1 hours, and preferably 6 to 1 hours. Coated fabrics or sheets of the compounded copolymer can be festooned in an oven held at the aforementioned temperature and live steam can be introduced therein. Also, for example, the stock in a form ready for molding can be placed in an oven containing open pans of water.

Another water-treatment procedure, particularly suitable for treating fabrics coated with the compounded carboxylic-modified copolymers, comprises holding the compounded copolymers in contact with liquid water at room temperature for about from 3 to 30, and preferably 10 to 25 hours, then heating the resulting wet compounded copolymers at a temperature of about from 125 to 200° F., and preferably 150 to 180° F., for about from 180 to 15, and preferably 60 to 30 minutes. This can be done, for example, by rolling up the coated fabric with a wet liner, then holding the roll at room temperature for about 3 to 30, and preferably 10 to 25 hours and finally unwinding and heating the resulting product at the temperatures just mentioned. Also, for example, the coated fabric can be run through a trough filled with water, wrapped with a liner to prevent sticking between the layers, held for a similar period at room temperature then heated as just described.

The compound copolymers, in a form ready for molding can also be immersed in liquid water at the aforementioned elevated temperatures, then dried, cured and molded. One preferred procedure, for example, is to immerse the compounded copolymers in water at a temperature of about from 125 to 200° F., and preferably 150 to 180° F. for about from 120 to 15 minutes, and preferably 60 to 30 minutes, then remove the resulting wet product from the water and heat it for similar periods at similar temperatures. The water-treated product need not necessarily be heated after it is removed from the hot water; however, in this case, it should be left in the hot water for a longer period, for example, for 90 minutes to 6 hours.

Any of the conventional molding and curing techniques can be used with the compounded carboxylic-modified copolymers which have been heated in the presence of water as described hereinbefore. Preferably and conventionally, they are molded under a pressure of about from 50 to 1,000 p.s.i. at temperatures ranging from 350 to 300° F. for about from 1 to 3 minutes, then cured for about 5 to 30 minutes at temperatures ranging from 300 to 350° F. at atmospheric pressure.

The process of this invention greatly reduces the tendency of carboxylic-modified copolymers of butadiene-1,3 hydrocarbons and acrylic nitriles compounded with polyvalent metallic oxides to stick in molds. Also, it greatly reduces the dwell time in such molds necessary for articles to retain a permanent shape. With coated fabrics, the process of this invention permits molding of intricately shaped articles without fabric migration.

Products of this invention can be used in any of the wide variety of applications for which molded articles of rubber and other synthetic polymers are now used. Such applications include, for example, molded gaskets, diaphragms, tarpaulins, bushings, heels for shoes and the like.

The following examples are intended to illustrate the invention and not to limit it in any way. Parts and percentages are by weight unless otherwise specified.

*Example 1*

A carboxylic-modified copolymer, prepared by the aqueous copolymerization of 55% of butadiene-1,3, 35% of acrylonitrile and 10% of methacrylic acid, is banded on a standard, two-roll rubber mill. The carboxylic-modified copolymer contains about 0.1 carboxyl equivalent of methacrylic acid per 100 parts of copolymer. Next, carbon black, plasticizer and stearic acid are thoroughly milled therewith. The resulting composition is then milled with accelerators and curatives to yield a stock having the following composition:

| | |
|---|---|
| Carboxylic-modified copolymer | 100 |
| Plasticizer: | |
|     P-cumarone indene resin | 10 |
|     Dibutoxyethyl sebacate | 20 |
| Carbon black | 75 |
| Tetramethyl thiuram monosulfide-accelerator | 0.4 |
| Stearic acid | 1.0 |
| Curing agents: | |
|     Zinc oxide | 5.0 |
|     Sulfur | 1.5 |
| | 212.9 |

A sample of the compounded stock has a Mooney viscosity of about 20 determined in accordance with A.S.T.M. D 927–55T as described hereinbefore.

The stock described above is next calendered onto both sides of a prime-coated parachute nylon fabric to yield a coated article having a total thickness of about 18 mils. The coated fabric is then festooned in an oven held at 160° F. Steam is injected into the oven and the coated fabric is held in the resulting saturated atmosphere for two hours. The oven is then opened and the product removed. After the above water treatment, the coating of compounded carboxylic-modified copolymer has a Mooney viscosity of about 50 to 60, that is, has increased in Mooney viscosity between 150 and 200%.

The water-treated coated fabric described above is next molded into diaphragms. First, the coated fabric is placed in a mold and held for 1.5 minutes at a temperature of about 335° F. at a pressure of about 750 p.s.i. The product is then removed from the mold and heated for about 25 minutes at 300° F. During the molding operation, the diaphragm does not stick in the mold and the fabric therein does not migrate.

If desired, the molded diaphragms just described can be cemented to various substrates, for example, metallic rims or base plates, before the final curing step described above. With conventional processes not employing the aforementioned water-treatment step, such diaphragms must be held in molds for such a long period in order to reduce sticking and in order that the molded articles retain their shape, that they are difficult to cement to other substrates.

When the procedure described above is repeated except that the water-treatment step is omitted, the diaphragms stick in the mold and the fabric therein migrates to the surface of the coating, particularly at protrusions and the like. In addition, in order to form diaphragms which will hold their shape, the dwell time in the mold must be on the order of 9 to 10 minutes.

If a carboxylic-modified copolymer polymerized from 60% of isoprene, 30% of acrylonitrile and 10% of acrylic acid is substituted for the carboxylic-modified copolymer described above, similar results are obtained.

*Example 2*

Eighty parts of a carboxylic-modified copolymer of about 69 parts of butadiene-1,3, 26 parts of acrylonitrile and 5 parts of methacrylic acid are banded with 20 parts of a copolymer of 72% of butadiene-1,3 and 28% of acrylonitrile, then compounded by the general procedure described in Example 1 to yield the following composition:

| | |
|---|---|
| Carboxylic-modified copolymer | 80 |
| Copolymer of butadiene-1,3 and acrylonitrile | 20 |
| Dibutoxyethyl sebacate-plasticizer | 40 |
| Carbon black | 75 |
| Stearic acid | 1 |
| Polymerized trimethyl dihydroquinoline-antioxidant | 2 |
| N-cyclohexyl-2-benzothiazole sulfenamide-accelerator | 1 |
| Curing agents: | |
|     Magnesium oxide (dispersed in 7.5 parts of di-(2-ethyl hexyl)phthalate) | 5 |
|     Sulfur | 0.5 |

The resulting stock is steam treated, then molded and cured as described in Example 1 to yield results substantially similar to those achieved in that example. During the steam treatment the Mooney viscosity of the compounded stock containing carboxylic-modified copolymer increases from about 14 to more than 30.

*Example 3*

A fabric coated on both sides with a compounded carboxylic-modified copolymer of butadiene-1,3 and acrylonitrile is prepared from the materials and by the procedure described in Example 1. The resulting fabric is then run through a trough of water, wound on a roll together with a liner and allowed to stand at room temperature for about 16 to 24 hours. The resulting sheet material is next heated at 175° F. for about 1 hour. After this heating in the presence of water, the Mooney viscosity of the compounded carboxylic-modified copolymer has increased more than about 100%. The resulting product can be molded and cured as described in Example 1 with substantially similar results.

*Example 4*

The procedure of Example 3 is repeated except that instead of running the coated fabric through a trough of water, it is wound on a roll with cotton sheeting saturated with water. Results substantially similar to those described in Example 3 are obtained.

*Example 5*

A fabric coated on both sides with a compounded stock of carboxylic-modified copolymer is prepared by the procedure from the materials described in Example 1. Open pans of water are inserted in an oven heated to about 160° F. and the atmosphere therein is allowed to come to an equilibrium humidity of about 90 to 100%. The coated fabric is then inserted in the oven and held in the humid atmosphere at 160° F. for about 6 hours. The resulting product is finally molded and cured as described in Example 1 with substantially similar results.

*Example 6*

A fabric coated on both sides with a compounded stock of carboxylic-modified copolymer is prepared from the materials described in Example 2 except that 5 parts of zinc oxide are used instead of the magnesium oxide curing agent used in that example. The compounded stock has a Mooney viscosity of about 14. Next, the coated fabric is immersed in water at about 165° F. for 30 minutes, then removed from the water and heated for 30 minutes at 165° F. After this treatment the coating of compounded carboxylic-modified copolymer has a Mooney viscosity of about 50. The resulting product can be molded and cured as described in Example 1 with substantially similar results.

A product with molding properties similar to the water-treated product described above is obtained if, instead of removing the sheet material from the water and heating it, the sheet material is left in the hot water for an additional 90 minutes.

I claim:

1. A process which comprises compounding at least one copolymer of about from 50 to 80% by weight of butadiene-1,3 and about from 10 to 45% by weight of acrylonitrile containing about from 0.01 to 0.3 carboxyl equivalent, per 100 parts by weight of copolymer, of at least one of the class consisting of acrylic and methacrylic acid with zinc oxide, coating a fabric with the resulting compounded copolymer, exposing the coated fabric to an atmosphere saturated with water and at a temperature of about from 150 to 180° F. for about from 1 to 6 hours until the Mooney viscosity of said compounded copolymer increases about from 100 to 200% and molding and curing the resulting product.

2. A process which comprises compounding a carboxylic-modified copolymer, containing about from 50 to 80% by weight of a butadiene-1,3 hydrocarbon, about from 10 to 45% of an acrylic nitrile and about from 0.01 to 0.3 carboxyl equivalents, with a polyvalent metallic oxide, coating a fabric with the resulting compounded copolymer, exposing the coated fabric at an atmosphere having a relative humidity of about 90 to 100% and a temperature of about 125 to 200° F. for about 10 hours to about 15 minutes until the Mooney viscosity of said copolymer increases from about 100 to about 600% and then molding and curing the resulting product.

References Cited in the file of this patent

UNITED STATES PATENTS

| | | |
|---|---|---|
| 2,662,874 | Brown | Dec. 15, 1953 |
| 2,710,292 | Brown | June 7, 1955 |

OTHER REFERENCES

Schildknecht: "Polymer Processes," pages 708–9, Interscience Publishers Inc., New York, 1956.